(12) United States Patent
    Kolkman et al.

(10) Patent No.: US 12,698,390 B2
(45) Date of Patent: Aug. 4, 2026

(54) CONVEYOR BELT

(71) Applicant: Envalior B.V., Geleen (NL)

(72) Inventors: Ard Jan Kolkman, Echt (NL);
Andreas Antonius Oosterlaken, Echt (NL)

(73) Assignee: ENVALIOR B.V., Geleen (NL)

( * ) Notice: Subject to any disclaimer, the term of this patent is extended or adjusted under 35 U.S.C. 154(b) by 508 days.

(21) Appl. No.: 17/926,821

(22) PCT Filed: May 27, 2021

(86) PCT No.: PCT/EP2021/064285
§ 371 (c)(1),
(2) Date: Nov. 21, 2022

(87) PCT Pub. No.: WO2021/239918
PCT Pub. Date: Dec. 2, 2021

(65) Prior Publication Data
US 2023/0203300 A1      Jun. 29, 2023

(30) Foreign Application Priority Data

May 29, 2020    (EP) .................................... 20177591

(51) Int. Cl.
C08L 67/02       (2006.01)
B29D 29/06       (2006.01)
B65G 15/32       (2006.01)
B29K 67/00       (2006.01)

(52) U.S. Cl.
CPC .............. *C08L 67/02* (2013.01); *B29D 29/06* (2013.01); *B65G 15/32* (2013.01); *B29K 2067/006* (2013.01); *B29K 2995/0012* (2013.01); *B65G 2201/0202* (2013.01); *C08L 2205/025* (2013.01)

(58) Field of Classification Search
CPC .......... C08L 67/02; B29D 29/06; B65G 15/32
See application file for complete search history.

(56) References Cited

U.S. PATENT DOCUMENTS

| | | | |
|---|---|---|---|
| 2005/0082147 A1 | 4/2005 | Mol | |
| 2012/0128911 A1 | 5/2012 | Akiba | |
| 2013/0292603 A1 | 11/2013 | Saga | |
| 2021/0115247 A1 | 4/2021 | Nakao et al. | |

FOREIGN PATENT DOCUMENTS

| | | |
|---|---|---|
| JP | 2007-321256 | 12/2007 |
| JP | 2013-234309 A | 11/2013 |
| JP | 2017-172794 | 9/2017 |
| WO | 2019/188285 | 10/2019 |

OTHER PUBLICATIONS

English Translation of 2017172794 (Year: 2017).*
Nakao (Machine Translation of JP 2017172794). (Year: 2017).*
International Search Report and Written Opinion of the ISA for PCT/EP2021/064285, mailed Sep. 24, 2021, 10 pages.
Notice of Reasons for Rejection, JP Application No. 2022-561063, Jun. 3, 2025.
R.W.M. van Berkel et al., Handbook of Thermoplastics, Chapter 17, "Polyester-Based Thermoplastic Elastomers", pp. 397-415 (1997).

* cited by examiner

*Primary Examiner* — Michael A Tolin
*Assistant Examiner* — Hana C Page
(74) *Attorney, Agent, or Firm* — NIXON & VANDERHYE P.C.

(57)       ABSTRACT

This invention relates to a conveyor belt comprising a composition comprising a) a (co)polyester A comprising hard segments comprising a polyester and having a melting temperature $T_{mA}$ of between 200° C. and 240° C. as measured according to ISO 11357-1/-3 (10° C./min), wherein the (co)polyester A is present in an amount of between 1 and 60 wt % with respect to the total weight of the composition; and b) a copolyester B comprising hard segments comprising a polyester wherein the (co)polyester B has a melting temperature $T_{mB}$ of between 100° C. and 180° C., as measured according to ISO 11357-1/-3 (10° C./min), wherein the copolyester B is present in an amount of between 40 and 99 wt % with respect to the total weight of the composition. The invention also relates to a process for preparing the conveyor belt.

21 Claims, No Drawings

CONVEYOR BELT

This application is the U.S. national phase of International Application No. PCT/EP2021/064285 filed May 27, 2021 which designated the U.S. and claims priority to EP 20177591.3 filed May 29, 2020, the entire contents of each of which are hereby incorporated by reference.

This invention relates to a conveyor belt. Conveyor belts are known and for example described in US2005082147A. Conveyor belts, and particularly extruded conveyor belts, need to remain flat during lifetime and thus need to exhibit low warpage, in order to work properly. Moreover, flights, teeth and/or guides are commonly welded to conveyor belts which enable a more efficient transportation of goods or to support movement of the belt. Moreover, conveyor belts need to be operated in a wide temperature range (e.g. between −30° C. and +120° C.), while still maintaining sufficient stiffness. In addition, conveyor belts are commonly spliced to create a single piece. Conveyor belts need to be cleaned regularly, thus need to exhibit sufficient chemical resistance.

Conveyor belts thus need to fulfil various requirements. It is an object of the present invention to provide a conveyor belt with sufficient welding performance, less warpage, and a stiffness strong enough to carry the required loads.

This object has been met by a conveyor belt comprising a composition comprising a) a (co)polyester A comprising hard segments comprising a polyester and having a melting temperature $T_{mA}$ of between 200° C. and 240° C. as measured according to ISO 11357-1/-3 (10° C./min), wherein the (co)polyester A is present in an amount of between 1 and 60 wt % with respect to the total weight of the composition; and b) a copolyester B comprising hard segments comprising a polyester wherein the (co)polyester B has a melting temperature $T_{mB}$ of between 100° C. and 180° C., as measured according to ISO 11357-1/-3 (10° C./min), wherein the copolyester B is present in an amount of between 40 and 99 wt % with respect to the total weight of the composition.

Surprisingly, the inventors have found that the conveyor belt according to the present invention exhibits good welding performance, while maintaining sufficient chemical resistance and stiffness. This has been demonstrated by examples. Additionally, the conveyor belt exhibited much higher tensile strength and load bearing capability compared to conventional copolyester belts having similar stiffness.

Preferably, the conveyor belt has a closed surface, which is particularly beneficial when transporting food, as contamination may be reduced. "Closed surface" is herein understood a surface void of holes.

Many plastics have been mentioned as a suitable material for conveyor belts. US2005082147A for example lists thermoplastic material, such as polyester or COPE for extruded conveyor belts, however, many of these materials exhibit warpage. Many materials used as material in conveyor belts warp after extrusion or during the lifetime of a belt. Warpage herein refers to relaxation of frozen tensions in an extruded material due to difference in flow and crystallization patterns of polymer molecules causing extruded materials, including belts, to change dimension anisotropically, causing a belt to 'warp'. This process may already start when cutting a belt to desired width and length and can even become more pronounced as a function of time, at elevated temperatures, and/or under the influence of (cleaning) chemicals during use of a belt.

Another advantage of the conveyor belt according to the invention is that it can be operated over a wide temperature range, such as for example between −30 and 120° C. This also allows cleaning the conveyor belts, with chemicals at an elevated temperature, without damaging the belt. Surprisingly, the conveyor belt according to the invention can also be operated under humid conditions.

Conveyor belts are regularly cleaned using a variety of cleaning agents. These agents can be antibacterial, strong acids, peroxides, disinfectants, etc. Surprisingly, the conveyor belt according to the invention exhibits sufficient chemical resistance.

(Co)polyester herein refers to the class of polymers including both polyester homopolymers and copolyester.

Copolyesters having certain melting temperatures are known in the art. The melting temperature of a copolyester may be influenced by for example the amount of hard and soft segments in a copolyester as well as the chemical nature of hard and soft segments including length and type.

(Co)polyester A

The conveyor belt comprises a composition comprising a (co)polyester A comprising hard segments of a polyester and having a melting temperature $T_{mA}$ of between 200° C. and 240° C. as measured according to ISO 11357-1/-3 (10° C./min), wherein (co)polyester A is present in an amount of between 1 and 60 wt % with respect to the total weight of the composition.

The conveyor belt comprises a composition comprising "a (co)polyester A", which includes more than one type of (co)polyester A comprising hard segments of a polyester and having a melting temperature $T_{mA}$ of between 200° C. and 240° C.

Hard segments of a polyester may for example be polyethylene terephthalate (PET), polypropylene terephthalate (PPT), polybutylene terephthalate (PBT), polybutylene isophthalate (PBI), polyethylene isophthalate (PEI), polyethelyene naphthalate, polybutylene naphthalate, and polypropylene naphthalate and combinations thereof. Preferably, the hard segment of the (co)polyester A is PBT as PBT is readily available. The (co)polyester A may consist of hard segments of PBT and is in that case also referred to as PBT as such, and is thus a polyester homopolymer. The (co)polyester A may also comprise more than one hard segment, such as for example PBT and PBI, and is then a copolyester.

(Co)polyester A may also comprise soft segments, which may be chosen from a wide range of polymers and include for example polytetramethylene oxide (PTMO), polyethylene oxide (PEO), polypropylene oxide (PPO), block copolymers of poly(ethylene oxide) and poly(propylene oxide), linear aliphatic polycarbonates, polybutylene adipate (PBA) and derivates of dimer fatty acids or dimer fatty acid diols, linear aliphatic polyesters and combinations thereof. Preferably, (Co)polyester A comprises a soft segment comprising polytetramethylene oxide (PTMO). Preferred amounts of hard and optionally soft segments in the (co)polyester A may vary and depend on the type of the segments and the desired stiffness for the application. Table 1 below shows options of various (co)polyesters A according to the present invention which have a different melting temperatures (Tm) reached for instance by using PBI or PTMO with varying lengths or PBT only in the chemical structure of (co) polyester A. For avoidance of doubt, (co)polyester A includes a wide range of (co)polyesters and is not limited to those mentioned in Table 1.

TABLE 1

| | | | wt % PTMO-650 | wt % PTMO-1000 | wt % PTMO-1400 | Tm (° C.) |
|---|---|---|---|---|---|---|
| | wt % PBT | wt % PBI | | | | |
| Option 1 | 100 | — | | — | — | 225 |
| Option 2 | 87 | 13 | | — | — | 200-210 |
| Option 3 | 72 | — | 28 | — | — | 200-210 |
| Option 4 | 65 | — | — | 35 | — | 200-210 |
| Option 5 | 55 | — | — | — | 45 | 200-210 |
| Option 6 | 72 | — | — | — | 28 | 210-220 |
| Option 7 | 81 | 9 | — | 10 | — | 200-210 | wt % is given with respect to the total weight of the (co)polyester.

The melting temperature $T_{mA}$ of the (co)polyester A is between 200° C. and 240° C. as measured according to ISO 11357-1/-3 (10° C./min). Preferably, the $T_{mA}$ is between 220° C. and 230° C. More preferably, (co)polyester A is PBT, which has a $T_{mA}$ of about 225° C., as this is readily available.

The relative solution viscosity of (co)polyester A is a property known as such and can be influenced by the polymerization conditions. The relative solution viscosity may further be increased by for example solid state post condensation processes, which are also known per se.

Viscosity number (VN) as calculated by ISO 1628-5:1998 can be expressed in relative solution viscosity by the following formula:

$$VN = (\eta_r - 1) \times 1/c \qquad \text{(Formula 1)}$$

In which $\eta_r$ is the relative solution viscosity (RSV) and c is the polymer concentration prescribed by the ISO norm (0.005 g/ml).

Preferably, the extruded conveyor belt comprises (co)polyester A, wherein the (co)polyester A exhibits an RSV of at least 1.55 as measured according to ISO 1628-5:1998 at 25° C. with m-cresol as a solvent, more preferably at least 1.85 and even more preferred at least 2.10. The RSV of the (co)polyester A may be as high as for example 4.0.

The amount of (co)polyester A present in the composition of the conveyor belt according to the invention is between 1 and 60 wt % with respect to the total weight of the composition, preferably between 5 and 50 wt % and even more preferred between 8 and 40 wt %, as it is crucial for the final mechanical, such as tensile, wear and abrasion strength, and chemical and heat resistance of the belt. If multiple (co)polyester A are present, the amounts above refer to the total amount of all (co)polyesters A.

Copolyester B

The conveyor belt comprises a copolyester B having hard segments of a polyester and having a melting temperature $T_{mB}$ of between 100° C. and 180° C., as measured according to ISO 11357-1/-3 (10° C./min). The conveyor belt may comprise more than one copolyester B comprising hard segments of a polyester and having a melting temperature $T_{mA}$ of between 100° C. and 180° C.

Hard segments of a polyester may for example be polyethylene terephthalate (PET), polypropylene terephthalate (PPT), polybutylene terephthalate (PBT), polybutylene isophthalate (PBI), polyethylene isophthalate (PEI), polyethelyene naphthalate, polybutylene naphthalate, and polypropylene naphthalate and combinations thereof. Preferably, the hard segment of copolyester B is PBT, and more preferred the hard segment is a combination of PBT and PBI, as this is readily available and allows for lower melting temperatures of (co)polyester B.

Copolyester B may also comprise soft segments, which may be chosen from a wide range of polymers and include for example polytetramethylene oxide (PTMO), polyethylene oxide (PEO), polypropylene oxide (PPO), block copolymers of poly(ethylene oxide) and poly(propylene oxide), linear aliphatic polycarbonates, polybutylene adipate (PBA) and derivates of dimer fatty acids or dimer fatty acid diols, linear aliphatic polyesters and combinations thereof. Preferably, copolyester B comprises a soft segment comprising polytetramethylene oxide (PTMO), this is approved for FDA food contact. Preferred amounts of hard and optionally soft segments in the copolyester B may vary and depend on the type of the segments and the desired stiffness for the application. Table 2 below shows suitable examples of copolyesters B which have a melting temperature of between 100° C. and 180° C. For avoidance of doubt, copolyester B includes a wide range of copolyesters and is not limited to those mentioned in Table 2.

PBI hard segments may be present in amounts of between 0 wt % to 50 wt %, with respect to the total amount of copolyester B, preferably between 5 and 40 wt %. PTMO soft segments may be present in amounts of between 0 and 80 wt % with respect to the total amount of copolyester B, preferably between 30 and 70 wt %. The amount and type of hard and soft segments may be determined by Infrared Spectroscopy or Nuclear Magnetic Resonance Spectroscopy.

TABLE 2

| | | | wt % PTMO-650 | wt % PTMO-1000 | wt % PTMO-1400 | Tm (° C.) |
|---|---|---|---|---|---|---|
| | wt % PBT | wt % PBI | | | | |
| Option 1 | 50 | — | 50 | — | — | 160-170 |
| Option 2 | 40 | — | — | 60 | — | 160-170 |
| Option 3 | 32 | — | — | — | 68 | 160-170 |
| Option 4 | 44 | 6 | — | 50 | — | 160-170 |
| Option 5 | 49 | 11 | — | 40 | — | 160-170 |
| Option 6 | 65 | 35 | — | — | — | 160-170 | wt % is given with respect to the total weight of the copolyester.

The melting temperature $T_{mB}$ of the copolyester B is between 100° C. and 180° C., preferably between 140° C. and 175° C.

The amount of copolyester B is between 40 and 99 wt % with respect to the total weight of the composition, preferably between 50 and 95 wt % and even more preferred between 60 and 93 wt %. The conveyor belt comprises a composition comprising "a copolyester B", which includes more than one type of copolyester B. If more than one copolyester B are present, the amounts above refer to the total amount of all copolyesters B.

Preferably, the copolyester B has a melting temperature $T_{mB}$ of at most 175° C., as measured according to ISO 11357-1/-3 (10° C./min), more preferably at most 170° C. as this improves weldability with other parts.

Preferably, the extruded conveyor belt comprises copolyester B, wherein the copolyester B exhibits an RSV of at least 2.0 as measured according to ISO 1628-5:1998 at 25° C. with m-cresol as a solvent, more preferably at least 2.2 and even more preferred at least 2.5. The RSV may be as high as for example 4.0.

Copolyesters may be prepared by methods known in the art, for example described in "Handbook of Thermoplastics" Marcel Dekker, Inc, 1997, pages 399-401.

The composition of the conveyor belt according to the invention preferably has a bimodal melting behavior exhibiting at least two peaks, one peak P1 between 200° C. and 240° C. and another peak P2 between 100° C. and 180° C. With "bimodal melting behavior" is herein understood that the melting curve of the composition of the conveyor belt according to the invention exhibits at least two peaks in the defined region, and explicitly includes melting curves with more than two peaks. Preferably, P1-P2 is at least 40° C., more preferably at least 50° C. and most preferred at least 60° C.

Preferably, the composition of the conveyor belt according to the invention exhibits an elongation at break at least 50%, more preferably at least 100%, even more preferred at least 150%, as measured on 1BA injection molded tensile bars and tested according to ISO 527-1/-2 as this allows for a flexible conveyor belt.

Preferably, the composition of the conveyor belt according to the invention has a bimodal melting behavior exhibiting at least two peaks as disclosed above, wherein the difference between $T_{mA}$ and $T_{mB}$ is at least 40° C., more preferably at least 50° C. and most preferred at least 60° C. as this ensures limited or no transesterification between the (co)polyester A and copolyester B phase, which results in the advantages being good RF weldability and limited warpage behavior after extrusion. If the difference between $T_{mA}$ and $T_{mB}$ and/or the difference between P1 and P2 is lower, then this is an indication that too much transesterification took place, which is disadvantageous for welding.

The conveyor belt according to the invention can be prepared by processes known in the prior art. Preferably, the conveyor belt is prepared by a process comprising at least the following steps:

a) Providing a composition comprising
   a (co)polyester A comprising hard segments of a polyester and having a melting temperature $T_{mA}$ of between 200° C. and 240° C. as measured according to ISO 11357-1/-3 (10° C./min), wherein the (co)polyester A is present in an amount of between 1 and 60 wt % with respect to the total weight of the composition; and
   a copolyester B comprising hard segments of a polyester and having a melting temperature $T_{mB}$ of between 100° C. and 180° C., as measured according to ISO 11357-1/-3 (10° C./min) wherein the copolyester B is present in an amount of between 40 and 99 wt % with respect to the total weight of the composition;
b) Bringing the composition to a temperature of between 230° C. and 290° C. to form a melt;
c) Extruding the melt through a die;
d) Cooling the extruded melt to form a conveyor belt;
e) Optionally welding parts onto the conveyor belt.

This process is also referred to as an extrusion process and provides an extruded conveyor belt. Surprisingly, this process results in a conveyor belt exhibiting less warpage. The invention thus also relates to an extruded conveyor belt comprising the composition as disclosed herein. After step d), the cooled extruded melt may be cut and sliced to desired width, length and or dimensions and may be spliced to form an endless belt.

Preferably, the difference between $T_{mA}$ and $T_{mB}$ is at least 40° C., more preferably at least 50° C. difference and most preferred at least 60° C. difference. An additional advantage is that the conveyor belt may be prepared using higher extrusion output, which reduces the production time of the conveyor belt. Further processing steps may be employed in the preparation of the conveyor belt, such as for example splicing ends together to form a continuous belt. Surprisingly, splicing can be advantageously employed by using the composition as disclosed above for the conveyor belt.

Welding may be performed by welding techniques known as such, such as for example radio-frequency-welding (RF-welding), vibration welding. Preferably, RF or high frequency (HF)-welding is performed, as this is the preferred technology used by the belting industry due to its superior reliability, repeatability (quality) and versatility. Further parts may be made of a different material, but preferably are made of the same composition as the belt.

The composition can be provided in step a) by providing the individual ingredients separately, for example by feeding (co)polyester A and copolyester B in separate feeders. The composition can also be provided in step a) as a blend, which may be obtained by for example dry-blending or melt-mixing the (co)polyester A and the copolyester B, which are processes known to a person skilled in the art. Melt-mixing, for example, can be performed in an extruder and may optionally be followed by a granulation step. This facilitates further processing of the composition.

Preferably, the process is carried out with the (co)polyester A with a low moisture content, such as for example with a moisture content of at most 0.02 wt %, preferably at most 0.01 wt %, with respect to the total weight of the (co)polyester A. Preferably, the process is carried out with the copolyester B with a low moisture content, such as for example with a moisture content of at most 0.02 wt %, preferably at most 0.01 wt %, with respect to the total weight of the copolyester B. Even more preferred, both (co)polyester A and copolyester B exhibit a low moisture content, such as disclosed above. This has the advantage that the decrease in viscosity is limited. Preferably, the (co)polyester A and/or the copolyester B are subjected to a drying step, before bringing the (co)polyester A and the copolyester B to a temperature of between 230° C. and 290° C. to form a melt, to decrease the moisture content of the (co)polyester A and/or the copolyester B. Drying may be done by known means.

The composition of the conveyor according to the invention may further comprise ingredients, which are as such commonly known in the industry and include for example nucleating agents, colorants, flame-retardants, polytetrafluoroethylene (PTFE), stabilizers, reinforcing fillers such as glass fibers etc. Nucleating agents for example includes sodium benzoate. For food applications, the conveyor belt preferably does not comprise glass fibers. Preferably the conveyor belt comprises a composition consisting essentially of (co)polyester A, copolyester B, and optionally colorants, thus the amounts of (co)polyester A and copolyester B and optional additives add up to 100 wt % with respect to the total amount of composition.

The invention also relates to a process for transporting food, comprising at least the following steps:
   a. Providing food on a conveyor belt;
   b. Moving the conveyor belt with the food in a desired direction;
wherein the conveyor belt is a belt according to the present invention as disclosed above. Surprisingly, this process allows for less degradation after cleaning as compared to a process in which a conveyor belt of for example thermoplastic polyurethane (TPU) or polyether block amide, also known as Pebax® is used. Another advantage, is that the conveyor belt may be recycled at the end of its life time.
Conveyor Belt

7

The conveyor belt according to the invention may have a wide range of widths from for example as low as 20 cm, to widths as wide as 3 m, and usually depends on the intended use of the belt. Surprisingly conveyor belts with higher widths, such as for example at least 100 cm still exhibit low warpage.

Thickness of the conveyor belt may also vary and may be for example between 1 mm and 10 mm, and also depends on the intended use of the belt. Optional flights and side walls may be present and preferably comprise the same composition as the conveyor belt, as this facilitates recycling of the belt after use.

Preferably, the conveyor belt according to the invention is monolithic, thus consisting of the composition as disclosed above.

Preferably, the conveyor belt according to the invention is an extruded conveyor belt, thus being prepared by extrusion.

The conveyor belt according to the invention may be used in various fields, such as for transporting goods, in particular food.

EXAMPLES

Materials Used

Polyester A-I; PBT

Melt volume-flow rate (T=250° C., weight=2.16 kg): 22 cm$^3$/10 min according to ISO1133

Melting temperature (10° C./min): 225° C. according to ISO11357-1/-3

Water absorption: 0.45 wt % (ISO 62)

Humidity absorption: 0.18 wt % (ISO 62)

Density: 1300 kg/m$^3$ according to ISO1183

RSV (m-cresol, 1 g/100 mL): 2.1 (ISO 1628-5:1998 and ISO307)

(Co)polyester A-II

Copolyetherester based on PBT as hard segment and PTMO as soft segment, containing, 65 m/m % hard segment and 35 m/m % soft segment.

Melt volume-flow rate (T=230° C., weight=2.16 kg): 9 cm$^3$/10 min according to ISO1133

Melting temperature (10° C./min): 207° C. according to ISO11357-1/-3

Water absorption: 0.65 wt % (ISO 62)

Humidity absorption: 0.20 wt % (ISO 62)

Density: 1200 kg/m$^3$ (ISO1183)

Shore D hardness (3s): 52 (ISO 868)

8

RSV (m-cresol, 1 g/100 mL): 3.2 (ISO 1628-5:1998 and ISO307)

(Co)polyester A-III

Copolyetherester based on PBT as hard segment and PTMO as soft segment, containing, 75 m/m % hard segment and 25 m/m % soft segment.

Melt volume-flow rate (T=230° C., weight=2.16 kg): 4 cm$^3$/10 min according to ISO1133

Melting temperature (10° C./min): 212° C. according to ISO11357-1/-3

Water absorption: 0.6 wt % (ISO 62)

Humidity absorption: 0.20 wt % (ISO 62)

Density: 1240 kg/m$^3$ according to ISO1183

Shore D hardness (3 s): 60 (ISO 868)

RSV (m-cresol, 1 g/100 mL): 3.4 (ISO 1628-5:1998 and ISO307)

(Co)polyester A-IV

Copolyetherester based on PBT as hard segment and PTMO as soft segment, containing, 90 m/m % hard segment and 10 m/m % soft segment.

Melt volume-flow rate (T=230° C., weight=2.16 kg): 18 cm$^3$/10 min according to ISO1133

Melting temperature (10° C./min): 221° C. according to ISO11357-1/-3

Water absorption: 0.6% (ISO 62)

Humidity absorption: 0.15% (ISO 62)

Density: 1290 kg/m$^3$ according to ISO1183

Shore D hardness (3 s): 70 (ISO 868)

RSV (m-cresol, 1 g/100 mL): 2.3 (ISO 1628-5:1998 and ISO307)

Copolyester B-I

Copolyester based on both PBT and PBI as hard segment and PTMO as soft segment, containing, 65 m/m % hard segments and 35 m/m % soft segment.

Melt volume-flow rate (T=230° C., weight=2.16 kg): 25 cm$^3$/10 min according to ISO1133

Melting temperature (10° C./min): 165° C. according to ISO11357-1/-3

Water absorption: 0.65 wt % (ISO 62)

Humidity absorption: 0.20 wt % (ISO 62)

Density: 1190 kg/m$^3$ according to ISO1183

RSV (m-cresol, 1 g/100 mL): 2.8 (ISO 1628-5:1998 and ISO307)

Preparation of Compositions

Compositions were made with recipes as listed in Table 3 by hand mixing the granules in the given ratio prior to injection molding.

TABLE 3

| | Polyester A-I, PBT, $T_{mA}$ = 225° C., [wt %] | Copolyester A-II, $T_{mA}$ = 207° C., [wt %] | Copolyester A-III, $T_{mA}$ = 212° C., [wt %] | Copolyester A-IV, $T_{mA}$ = 221° C., [wt %] | Copolyester B-I, $T_{mB}$ = 165° C., [wt %] | $T_{mA} - T_{mB}$ [° C.] |
|---|---|---|---|---|---|---|
| | | | Compositions | | | |
| Example 1 | 30 | 0 | 0 | 0 | 70 | 60 |
| Example 2 | 20 | 0 | 0 | 0 | 80 | 60 |
| Example 3 | 10 | 0 | 0 | 0 | 90 | 60 |
| Example 4 | 0 | 0 | 80 | 0 | 20 | 47 |
| Example 5 | 0 | 0 | 0 | 50 | 50 | 56 |
| Comparative experiment A | 0 | 50 | 50 | 0 | 0 | |
| Comparative experiment B | 100 | 0 | 0 | 0 | 0 | N.A. |
| Comparative experiment C | 0 | 0 | 0 | 0 | 100 | N.A. | wt % with respect to the total weight of the composition.

Preparation of Test Plaques and 1BA Tensile Bars by Injection Moulding

Where applicable, ISO 294-1 Standard was used.

Plaques with dimensions 120×120×4.0 mm were molded with pre-dried material.

Material was dried 6 hr/120° C. with vacuum and N2 purge. Moisture content after drying below max. moisture spec. (<500 ppm). Material was processed on an Injection molding machine brand Arburg with clamp force 150 tons and 40 mm screw diameter. Measured melt temperature 247 and 248° C. Measured mold temperature was between 40 and 43° C. Thickness of the produced plaques was measured between 3.97 and 4.0 mm.

Parts are packed dry as molded in seal bags.

Plaques with dimensions 80×80×1 mm were molded with pre-dried material. Material was dried 6 hr/120° C. with vacuum and N2 purge. Moisture content after drying below max. moisture spec. (<500 ppm). Material was processed on an Injection molding machine brand Arburg with clamp force 110 tons and 25 mm screw diameter. Measured melt temperature 246 and 247° C. Measured mold temperature was between 17 and 27° C. Thickness of the produced plaques was measured at 1.02 mm. Parts are packed dry as molded in seal bags.

Tensile bars ISO 527-1BA were molded with pre-dried material. Material was dried 6 hr/120° C. with vacuum and N2 purge. Moisture content after drying below max. moisture spec. (<500 ppm). Material was processed on an Injection molding machine brand Arburg with clamp force 70 tons and 20 mm screw diameter. Measured melt temperature between 229 and 236° C. Measured mold temperature was between 46 and 51° C. Thickness of the produced bars was measured between 2.04 and 2.05 mm. Parts are packed dry as molded in seal bags.

Relative Solution Viscosity

The relative solution viscosity was determined in a solution of 1.0 gram of material in 100 ml of m-cresol at 25° C. according to ISO 1628-5:1998.

Mechanical Properties

Tensile bars type 1BA, according to ISO527, were tested on a Zwick//Roell Z010 tensile tester equipped with a 2.5 kN force cell, Zwick contact extensometers type Multisens with a gauge length of 25 mm and Zwick pneumatic clamps type 8297 with a gripping distance of 58 mm. After a preload of 0.5N was applied, the test starts with a test speed of 1 mm/min to determine E-modulus (0.05%-0.25%) followed by a test speed of 500 mm/min until rupture. Strain was measured up to 60% strain with extensometers, followed by traverse displacement until rupture. Tensile Strength (M Pa) was determined as the highest found stress during testing. The tests were carried out in fivefold. The specimens were "Dry As Moulded" during testing, and the tests were conducted at a test temperature of 23° C. "Dry As Moulded" is herein understood that immediately after moulding the specimens were placed in a moisture-proof container and stored at (23±2)° C. for at least 24 h and having a moisture content <0.2% (mass fraction).

Dynamical Mechanical Analysis (DMA)

From the 150 mm×150 mm×4.0 mm injection molded plaques, DMA in torsion were performed which are generally described in ASTM D5279. The samples for the measurements were sawed to a suitable length (10 mm×55 mm), parallel and perpendicular to the melt flow in injection molding. The dimensions were measured with the calibrated Heidenhain thickness meter. Prior to the measurements, the samples were dried for 4 h at 110° C. at 150 mbar nitrogen pressure. The dynamic mechanical analyses were carried out using a TA ARES test system at a frequency of 1 Hz and over a temperature ranging from −130° C. to 250° C. with a heating rate of 3° C./min. During the measurements, the storage modulus (G'), loss modulus (G") and tangent delta (tan δ) were determined as a function of temperature.

Weldability

Welding was performed on the 80 mm×80 mm×1.0 mm injection molded plaques. Two plaques were placed on top of each other. Welding was performed on a 16 KW RF welding machine with a vertical press set-up. An electrode brass 75×10 mm$^2$ was used. Temperature of the main block was controlled at 200° F. (93.3° C.). Temperature of the contact plate was not controlled but measured typically at 110° F. (43.3° C.). Each RF welding cycle consisted of: 1.0 second pre-heat when pressure is applied; 2.5 seconds during which Amperage is applied; 2.0 seconds cooling cycle. The amperage is controlled by a percentage of the maximum power. 180° peel tests were performed to quantify the maximum peel force of the weld using the procedure as described below. The welded plaques were put into room environment with a temperature range of 23+/−2° C., 50+/−10% RH for 3 days; Plaques with a width of 10 mm were marked with a mark pen and manually cut with scissors; test parameter such as preload*, grip distance (50 mm), test speed (50 mm/min) were put in the software; The thickness and width of specimens were measured and put into the test software; The outsides of non-welded parts of the bar were clamped in the grips, after which the peel test can be started; After peel test, the specimen was removed from grip; The testing environment: 23+/−2° C., 50+/−10% RH. The maximum peel force (in Newton) is reported in Table 4. * Preload (the value is not zeroed after starting test): The exact value was set based on initial load of each sample when the test bar was just clamped in grips, before start test.

Warpage

Warpage is tested by cutting test samples of for example 100 mm×40 mm from an extruded plate of 4 mm in flow direction and contra flow direction and in various positions over the width of the extruded plate and expose these test samples at 100° C. for 24 hrs. The dimensional change can visually be recorded and qualitatively assessed. The scale ranges from no warpage at all, thus completely flat as "+++" via curled up at the edges "+/−", to ultimately completely distorted, denoted by "−−−". Results are given in Table 4.

Chemical Resistance

In order to assess the resistance of the compositions as described under examples 2 and 3, chemical resistance was evaluated. 1BA tensile bars were subjected to 672 h of ageing in 75% Ethanol (23° C.), 30% Phosphoric acid aqueous solution (60° C.), 3% Phosphoric acid aqueous solution (60° C.), 14% NaClO aqueous solution (23° C.), 200 ppm NaClO aqueous solution (23° C.) and 2000 ppm peracetic acid aqueous solution (23° C.). In none of the above-mentioned chemicals, a drop in mechanical properties (by means of elongation at break) was observed. Mechanical testing was performed according to ISO527.

TABLE 4

| | $G'_{\tau=-40°\,C.}$ (MPa) | $G'_{\tau=-23°\,C.}$ (MPa) | $G'_{\tau=-100°\,C.}$ (MPa) | Tensile strength (MPa) | Warpage | Maximum Peel force at 55% power (N) | Maximum Peel force at 70% power (N) |
|---|---|---|---|---|---|---|---|
| | | | | | | Results | |
| Example 1 | 455 | 135 | 36 | 30 | ++ | 1 | 87 |
| Example 2 | 397 | 90 | 27 | 32 | ++ | 27 | 151 |
| Example 3 | 358 | 65 | 23 | 31 | +++ | 74 | 187 |
| Example 4 | 569 | 177 | 50 | n.d. | +/− | n.d. | n.d. |
| Example 5 | 537 | 155 | 44 | n.d. | + | n.d. | n.d. |
| Comparative experiment A | 484 | 103 | 47 | 23 | − | <0.5* | <0.5* |
| Comparative experiment B | 1100 | 892 | 123 | n.d. | −−− | <0.5* | <0.5* |
| Comparative experiment C | 288 | 32 | 14 | 27 | +++ | n.d. | n.d. |

*Peel forces were tried to be measured, but weld strength was very bad, therefore the value was set to less than 0.5;
n.d. = not determined.

Surprisingly, a conveyor belt according to the invention with a similar G' at room temperature, which is a measure for the stiffness of the belt, exhibited a much higher tensile strength. Surprisingly, even a much softer extruded conveyor belt (example 3), still exhibited a high tensile strength in combination with a high peel strength, which is indicated by a high peel force. The conveyor belt according to the invention exhibited low warpage, thus were substantially flat in combination with a high peel strength.

The invention claimed is:

1. A conveyor belt which is formed of a polyester composition comprising a blend of:

a) between 1 and 60 wt % with respect to the total weight of the composition of a (co)polyester A comprising hard segments comprising a polyester, wherein the (co)polyester A has a melting temperature $T_{mA}$ of between 200° C. and 240° C. as measured according to ISO 11357-1/-3 (10° C./min); and b) between 40 and 99 wt % with respect to the total weight of the composition of a copolyester B comprising hard segments comprising a polyester, wherein the copolyester B has a melting temperature $T_{mB}$ of between 100° C. and 180° C., as measured according to ISO 11357-1/-3 (10° C./min), wherein the polyester composition contains no glass fibers or nucleating agents such that the conveyor belt formed of the polyester composition exhibits less warpage as compared to a conveyor belt formed of a polyester composition in which the copolyester B is replaced by the (co) polyester A.

2. The conveyor belt according to claim 1, wherein the polyester composition has a bimodal melting behavior exhibiting at least two peaks, wherein one peak P1 is between 200° C. and 240° C. and another peak P2 is between 100° C. and 180° C.

3. The conveyor belt according to claim 2, wherein $T_{mA}$-$T_{mB}$ is at least 40° C. and/or P1-P2 is at least 40° C.

4. The conveyor belt according to claim 1, wherein the hard segments of the (co) polyester A and/or the copolyester B comprise polybutylene terephthalate (PBT).

5. The conveyor belt according to claim 1, wherein the copolyester B comprises soft segments selected from the group consisting of aliphatic polyesters, aliphatic polyethers, dimer fatty acids, dimer fatty diols and combinations thereof.

6. The conveyor belt according to claim 1, wherein copolyester B further comprises polybutylene isophthalate (PBI) segments in an amount of between 5 and 50 wt % with respect to the total amount of copolyester B.

7. The conveyor belt according to claim 1, wherein the polyester composition further comprises at least one additive selected from the group consisting of stabilizers, colorants and combinations thereof.

8. The conveyor belt according to claim 1, wherein the (co) polyester A is polybutylene terephthalate (PBT).

9. The conveyor belt according to claim 1, wherein the conveyor belt is an extruded conveyor belt.

10. The conveyor belt according to claim 2, wherein $T_{mA}$-$T_{mB}$ is at least 50° C. and/or P1-P2 is at least 50° C.

11. The conveyor belt according to claim 2, wherein $T_{mA}$-$T_{mB}$ is at least 60° C. and/or P1-P2 is at least 60° C.

12. The conveyor belt according to claim 1, wherein the copolyester B comprises soft segments of an aliphatic polyether.

13. The conveyor belt according to claim 12, wherein the aliphatic polyether is polytetramethylene oxide (PTMO).

14. A process for preparing the conveyor belt according to claim 1, comprising at least the following steps:

a) providing the polyester composition comprising the blend of the (co) polyester A and the copolyester B;

b) bringing the polyester composition to a temperature of between 230° C. and 290° C. to form a melt;

c) extruding the melt through a die;

d) cooling the extruded melt to form the conveyor belt; and e) optionally welding parts onto the conveyor belt.

15. The process according to claim 14, wherein $T_{mA}$-$T_{mB}$ is at least 40° C.

16. The process according to claim 14, wherein $T_{mA}$-$T_{mB}$ is at least 50° C.

17. The process according to claim 14, wherein $T_{mA}$-$T_{mB}$ is at least 60° C.

18. The process according to claim 14, wherein the copolyester B further comprises soft segments selected from the group consisting of aliphatic polyesters, aliphatic polyethers, aliphatic polycarbonates, dimer fatty acids, dimer fatty diols and combinations thereof.

19. The process according to claim 14, wherein step a) comprises providing the polyester composition as a dry blend by mixing the (co) polyester A and the copolyester B.

20. The process according to claim 14, wherein the process further comprises subjecting the (co) polyester A and/or the copolyester B to a drying step before bringing the (co) polyester A and the copolyester B to a temperature of between 230° C. and 290° C. to form a melt according to step b).

21. A process for transporting food, comprising at least the following steps:

(i) providing the conveyor belt according to claim 1;

(ii) providing food on the conveyor belt; and (iii) moving the conveyor belt with the food thereon in a desired direction.

\* \* \* \* \*